Aug. 12, 1969   J. TKACH   3,460,319
CONTROLLED VOLUME DEGASIFICATION OF LIQUID
Filed April 11, 1967
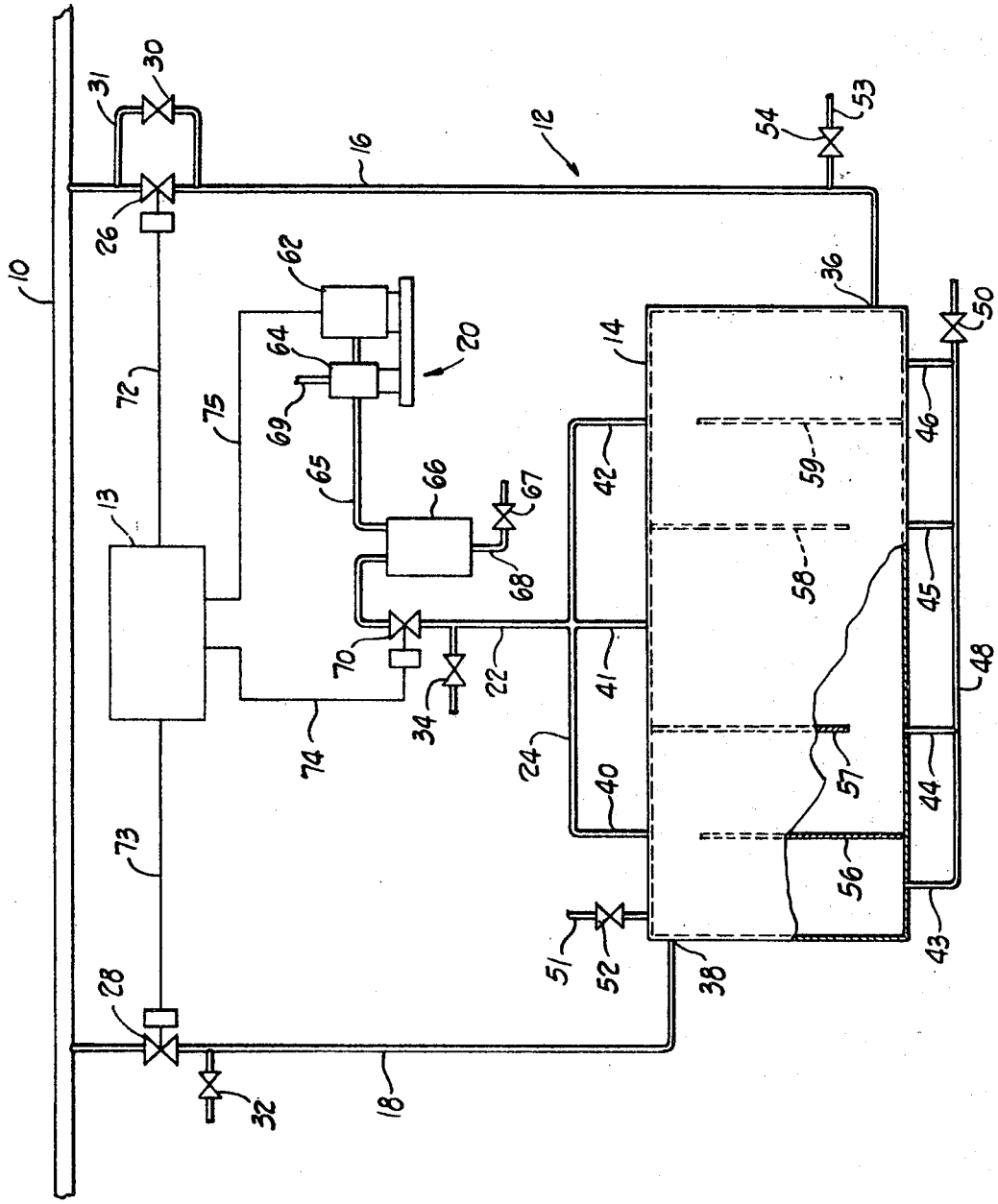
INVENTOR.
JOSEPH TKACH
BY Watts, Hoffmann,
Fisher & Heinke
ATTORNEYS.

United States Patent Office 3,460,319
Patented Aug. 12, 1969

3,460,319
CONTROLLED VOLUME DEGASIFICATION OF LIQUID
Joseph Tkach, 6481 Glenwillow Drive,
North Royalton, Ohio 44133
Filed Apr. 11, 1967, Ser. No. 630,003
Int. Cl. B01d 19/04
U.S. Cl. 55—19  8 Claims

ABSTRACT OF THE DISCLOSURE

Controlled volumes of liquid are automatically introduced and removed from a chamber and degasified in the chamber by establishing saturation of liquid and vapor for a predetermined time, all under automatic control. Degasification time is initially determined by changing the pH of the liquid with a substance that is removed by degasification and determining the degasification time needed to stabilize the pH value.

Background of the invention

*Field of the invention.*—This invention relates to the degasification of liquids, especially to the degasification of controlled volumes of water or other process liquids. It also relates to a novel method of calibrating the degasification to determine when a liquid is satisfactorily degasified, and to a system for degasifying liquid to automatically remove gases to a level predetermined in accordance with the calibration.

*Description of the prior art.*—The disadvantages of entrained air and dissolved gases in liquids has been recognized for a considerable time. Such gases cause corrosion of metals, vapor bind systems in which the liquids are used, and in the case of liquids used in production processes, can affect both the quality of an end product and the reaction characteristics of reactants in the process.

Several methods are currently used in the degasification of liquids, especially when degasified is accomplished on an intermittent basis. These methods include:

(a) Counter flow scavenging. A gas that is not in the liquid to be degasified is passing counterflow, usually upward, in a vertical chamber through downcoming liquid. This causes dissolved gases in the liquid to be liberated by the phenomenon of partial pressures. An example of this is the blowing of air through a straw in a carbonated beverage. Another example of this type of degasification is the liberation of carbon dioxide from waters highly laden with bicarbonate alkalinity which have been passed through a hydrogen zeolite cation exchanger. A primary deficiency of this process lies in the contamination of the liquid with scavenging gas. Also, it is unlikely that the undesirable gases will be completely removed from the liquid, due to such factors as the "hardness," the temperature, and the pH of the liquid. Further disadvantages include the need for large apparatus requiring special construction materials, high continued operating costs, and the need to constantly monitor the performance.

(b) Degasification by vacuum stripping. This method requires apparatus similar to that used in the counterflow scavenging. Contaminated liquid is introduced at the top of a closed column and passes downward over a series of slotted trays to disperse the liquid and release entrained air or gas. This also increases the surface area of the liquid to promote the release of dissolved gas upon application of sub-atmospheric pressures. External inducers create reduced pressures at a number of openings along the vertical axis of the column through which the liquid passes. Gases liberated from the liquid are drawn from the column at these points and are discharged to the atmosphere. In such a process, the initial and continued operating costs are high and the degree of deaeration leaves much to be desired. In particular, it is difficult to evacuate gases from the interior parts of the column of liquid and liquid is recontaminated in its downward progress by the gases which have been liberated at the lower levels.

(c) Torricelli method (so called because it applies the principle developed by Torricelli in the invention of the barometer, i.e., evacuating a sealed container). Liquid is pumped from a sealed contained to reduce the pressure above the liquid remaining in the container. Recontamination is a strong adverse factor in this method because a part of the liquid being degasified is then used to displace the gases which are liberated in preparation for the next cycle.

(d) Chemical treatment. Chemical compounds have been developed to either neutralize gases in liquids or to apply a protective film to system materials. Chemical treatment is in most cases expensive and is difficult to apply in proper proportions to render a continuous high level of protection. Where low dissolved solids concentrations in the liquid is required, chemical treatment is not possible because the additive compounds and their reactions with the gases contributes substantially to the total solids content.

Summary of the invention

In the present invention, a volume of liquid to be degasified is drawn from a source, such as a main conduit of a system in which the liquid is being utilized or processed. The volume of liquid withdrawn is introduced to and partially fills a degasification chamber. The liquid is stilled by eliminating the velocity, i.e., stopping its flow, to provide some initial degasification. Atmosphere above the liquid is then withdrawn to reduce the pressure to a value that establishes saturation conditions at the temperature of the liquid. This condition is maintained for a predetermined time period sufficient to permit the release and removal of entrained air and dissolved gases from the liquid. The degasified liquid is then removed from the chamber and reintroduced to the system, preferably by introducing additional liquid to the chamber from the system in a manner to force the treated liquid out of the chamber without substantial intermixing. In a closed system separate volumes of liquid are withdrawn from the system through a branch loop connected with the main flow, degasified, and then returned. Liquid can also be degasified in the above manner prior to being supplied to a process to prevent the introduction of entrained or dissolved gases. If a constant flow degasified liquid is required, a multiple arrangement of the basic system can be provided.

Calibrated controls are provided for automatically processing successive volumes of liquid for predetermined times in the above manner. The calibration assures that degasification will continue for sufficient but not excessive time to accomplish desired gas removal. In accordance with this invention, the time needed to degasify a liquid to a desired level is determined by first dissolving in the liquid a substance, such as carbon dioxide, that will change the pH, i.e., the basicity or acidity of the liquid, and then degasifying until the pH value stabilizes, as by returning to the original level, indicating that the dissolved gas has been removed. The test substance is selected to have the same or a greater degree of solubility than the gas or gases normally found dissolved in the liquid so that the time needed for its removal will assure removal of the other gases as well.

As will be apparent from the above, the present invention not only provides a relatively simple and low cost approach to degasifying liquids, but also overcomes the disadvantages of the prior art mentioned above. In particular, (a) there is no contamination of the liquid by a scavenging agent used to unbalance vapor pressures, (b) the liquid being degasified is not recontaminated by the gases that have been removed, as in the case of vacuum stripping and the Torricelli method, and (c) chemical additives are not used and their attendant disadvantages are therefore avoided.

Accordingly, it is an object of this invention to provide improved methods and apparatus for degasifying controlled volumes of liquid to assure adequate removal of gases and to avoid recontamination of degasified liquids. Other objects, features and advantages of this invention will become apparent from the following detailed description of a preferred embodiment, when considered in conjunction with the accompanying drawing.

Brief description of the drawing

The drawing is a diagrammatic layout of a closed piping system embodying degasification apparatus constructed in accordance with present invention.

Description of a preferred embodiment

Referring now to the drawing, a main pipe or conduit 10 is shown for conveying liquid to be degasified. Typically, the pipe or conduit can be part of a hot water heating system or a conduit for carrying chemicals, such as reactants or products in a processing system. A branch loop for degasifying controlled volumes of liquid from the main pipe 10 is indicated generally by reference numeral 12. A controller-programmer 13 is associated with the branch loop 12, and controls the degasification operation.

The branch loop 12 connects a degasification chamber 14 to the main pipe or conduit 10. The loop includes a supply pipe 16 connected from the main pipe 10 to one end of the degasification chamber 14 and a discharge pipe 18 extending from the degasification chamber back to the main pipe 10. Apparatus for inducing a reduced pressure in the degasification chamber 14 is indicated generally by reference numeral 20 and is connected with a pipe 22 from a header 24 associated with the degasification chamber.

A normally closed solenoid control valve 26 is provided in the supply pipe 16 to control the flow of liquid from the main pipe 10 to the degasification chamber 14. A second normally closed solenoid control valve 28 is provided in the discharge pipe 18 to control the flow of processed liquid from the degasification chamber 14 back to the main pipe 10. Both valves 26 and 28 are operated by the controller-programmer 13. A manually operable fill valve 30 is provided in a pipe 31 that by-passes the solenoid control valve 26. A valve 32 off of the discharge pipe 18 and a valve 34 off of the pipe 22 from the header 24 are also manually operable and when opened facilitate the initial charging of the system through the fill valve 30.

The degasification chamber 14 is a large horizontally elongated tank having an inlet 36 at one end adjacent the bottom of the tank, and an outlet 38 at the opposite end of the tank adjacent the top. The header 24 communicates to the top of the chamber 14 through three pipes 40, 41, 42. A plurality of drain pipes 43—46 extend from the bottom of the chamber 14 and are connected by a header pipe 48 having a drain valve 50. For calibration purposes a pipe connection 51 and valve 52 are provided at the top of the chamber 14 adjacent the outlet 38 and a similar connection 53 and a valve 54 extend from the supply pipe 16 adjacent the chamber inlet 36. These two connections and valves facilitate the attachment of test equipment (not shown) used to calibrate the degasification system in a manner to be described subsequently.

Four baffles 56, 57, 58, 59 are fixed within the chamber 14 to prevent a direct flow of liquid from the inlet 36 to the outlet 38. The baffles are formed by spaced flat plates that extend transversely of the chamber 14 from the top and bottom to establish a tortuous path of liquid flow through the chamber. In the arrangement shown, the two baffles 56, 59 adjacent each end of the chamber 14 extend upward from the bottom of the chamber while the two central baffles 57, 58 extend downward from the top of the chamber, each extending more than half-way across the chamber. The baffles minimize the intermixing of fresh liquid introduced to the chamber through the inlet 36 with degasified liquid in the chamber. As a result the incoming liquid forces the degasified liquid through the outlet 38 without substantial contamination of degasified liquids by the succeeding charge.

The apparatus 20, which induces a vacuum within the chamber 14 includes an electric motor 62 and a vacuum pump 64 driven by the motor. The pump 64 is connected by a pipe 65 to the pipe 22 of the header 24 through a surge chamber 66, which prevents a carry-over of liquid from the degasification chamber 14 to the pump 64. The vacuum pump 64 may be of any conventional self unloading type, such as a reciprocating, rotary vane, centrifugal, or ejector type pump. A check valve 67 connected by a pipe 68 to the surge chamber 66 permits wasting of carryover liquid from the surge chamber during the recharge cycle. A vent line 69 from the pump 64 discharges to the atmosphere gases liberated from the liquid in the chamber 14. A solenoid operated valve 70 in the pipe 22 selectively isolates or connects the inducer apparatus 20 with the degasification chamber 14, under control of the programmer-timer 13.

As diagrammatically indicated in the drawing, the programmer-timer 13 is electrically connected by circuits 72, 73, 74 with the solenoid operated valves 26, 28, 70, respectively. It is also connected by a circuit 75 to the pump motor 62.

The controller-programmer 13 is a sequence timer that electrically controls the operation of the circuits 72–75 to open and close the solenoid valves 26, 28, 70 and to energize and de-energize the pump motor 62 in accordance with a preset program. Suitable controller-programmers are well known in the art, and the specific construction of the controller-programmer 13 does not form a part of this invention. It will be apparent that in lieu of the electrical connections from the controller-programmer to the automatic valves and pump motor, pneumatic or other type circuits can be utilized.

With this system, gas is removed from the liquid carried by the main pipe or conduit 10 by isolating controlled volumes of liquid and reducing the pressure over the isolated volumes to establish saturated conditions in the chamber 14 for a predetermined time. Saturation pressures is that pressure at which a vapor exists in equilibrium with its liquid. Below saturation press, some of the liquid will change to vapor. Above saturation pressure, some of the vapor will condense to liquid. The pressure required for saturation at any given temperature can be readily determined, e.g., from available tables. It is recognized that exact equilibrium is difficult to obtain or maintain, and in the present system an imbalance toward a pressure slightly lower than saturation pressure is established to assure adequate degasification. As long as the pressure is maintained substantially near saturation pressure there will not be excessive loss of liquid due to the exhausting of vapor from above the liquid. At saturation pressure, the time required for adequate removal of gas from the liquid is determined by tests, and the degasification system is calibrated in the manner to be described, to provide a proper degasification time.

In operation, the degasification system is initially charged through the filing valve 30 while air in the system is purged from valve 32 connected with pipe 18 and valve 34 connected with pipe 22. When the filling operation is completed, the valves 30, 32, 34 are closed manually and remain closed during the operation of the degasifier apparatus. The normally closed solenoid actuated valves 26, 28, 70 isolate the liquid in the chamber 14 from any inflow from the pipe 10 or any outflow to the pipe 10. The controller-programmer 13 is then actuated to begin the control of the first and successive cycles of degasification.

The controller-programmer 13 energizes the pump motor 62 of the inducer apparatus 20 through the electrical circuit 75. The solenoid operated valve 70 in the pipe 22 is then opened by the controller-programmer 13 through the circuit 74, connecting the header 24 to the inducer apparatus 20. The pump 64 operates to lower the pressure in the degasification chamber 14 to a level that establishes saturated conditions above the liquid. The pressure level is predetermined on the basis of a prior calibration that takes into account the temperature of the liquid being processed.

Gas entrained in the liquid is the first of the gases to be separated. Much of this gas will be separated as a result of the stilling, i.e., elimination of the velocity, of the liquid after it enters chamber 14. This gas will occupy the topmost position in the suction header 24. Gases dissolved in the liquid are then liberated by reduction of pressure in the chamber 14 to the value that establishes saturation conditions. These gases along with the entrained gases are drawn through the suction header 24, through the now open valve 70, into the surge chamber 77 and then to the pump 64 where the gases are discharged to atmosphere through the venting outlet 69. The pump 64 is self-unloading and permits atmospheric pressure to enter the surge chamber 66 during the recharge cycle of the operation.

Upon completion of the degasification part of the cycle, as controlled by the controller-programmer 13, the solenoid operated valve 70 is closed by the controller-programmer 13 through the circuit 74. The motor 62 of the pump 64 is then de-energized and the controller-programmer 13 opens normally closed solenoid operated valves 26, 28 through circuits 72, 73, respectively. A fresh charge of liquid now enters the degasification system 12 through the pipe 16 and valve 26 under pressure from main pipe 10. For more rapid removal of degasified liquid from the tank 14, a pump can be installed in the discharge pipe 18. The incoming liquid displaces the degasified liquid in the chamber 14, which flows through the outlet 38, discharge pipe 18 and valve 28 to the main pipe 10. The baffles 56–59 in the chamber 14 inhibit intermixing of the incoming liquid with the degasified liquid being displaced so that the liquid discharge into the main pipe 10 consists essentially of degasified liquid. This is especially true if the entire volume of liquid from the chamber 14 is not changed during each cycle.

During continued operation the cycle already described, excluding the initial chraging, is repeated at predetermined intervals. Each succeeding charge of liquid is introduced from the main pipe 10 to the branch loop 12 for degasification, the distribution of total flow through the main pipe 10 and the loop 12 being determined by the relative resistance to flow that each possesses.

Installation of the degasification apparatus is accompanied by calibration to determine the filling time and degasification time needed for each cycle. The controller-programmer 13 is then set to establish the times necessary for proper cycling.

The time necessary for obtaining the required degasification is determined by introducing a substance to the liquid in the chamber 14, which changes pH value, i.e., the acidity or basicity of the liquid, and which will be removed during degasification. The selected substance must have a solubility substantially the same as or somewhat greater than the gas to be removed so that the time needed to remove the added substance will be an indication of the time needed for adequate removal of gases normally found in the liquid. By way of example, where water is the liquid being degasified, carbon dioxide can be introduced through the inlet pipe 53 and valve 54 to the liquid being introduced into the chamber 14 during a charge portion of the cycle. This will lower the pH valve of the liquid, which can be determined at the pipe 51. During calibration, periodic readings are taken of the pH value. As the liquid in the chamber 14 is degasified, the pH value of the liquid will rise until a stabilized pH reading is obtained. This will indicate that maximum removal of the dissolved gases has been achieved and will thereby establish the time interval required for degasification. Thereafter, the liquid can be degasified under control of a programmer for the time interval indicated.

The pH value of the liquid being degasified can be determined at the outlet 51 with a pH meter that measures the conductivity of the liquid, or with a chemical indicator. As an alternative to dissolving a gas, such as carbon dioxide, it is possible to introduce a liquid, such as carbonic acid or ammonium hydroxide, which is unstable at degasification pressures and which will affect the pH value of the liquid while they are present.

While in the foregoing disclosure a preferred embodiment of this invention has been described with particularity, it will be apparent that numerous modifications or alterations may be made therein without departing from the spirit and scope of the invention, as set forth in the appended claims.

What is claimed is:

1. A method of degasifying liquid by evacuating gases from above a confined volume of the liquid, including a technique for determining the time needed at a given liquid temperature and at a given pressure to remove gasses from the liquid to a desired level which comprises the steps of:
    (a) dissolving a substance in the liquid that will change the pH value of the liquid and that will be removed as a gas when the pressure above the liquid is subsequently reduced,
    (b) reducing the pressure above the confined volume of liquid to a level at which gas dissolved in the liquid will be removed,
    (c) determining the pH value of the liquid at time intervals while the pressure is so reduced, and
    (d) determining a time during which the pressure has been reduced at which the pH value of the liquid has stabilized.

2. The method of degasifying liquid as in claim 1 including the subsequent steps of:
    (e) removing the confined volume of liquid and replacing it with a second equal volume of liquid at substantially the same temperature,
    (f) reducing the pressure above the second volume of water to the extent and for the time determined in step (d), and
    (g) thereafter repeating steps (e) and (f) at intervals.

3. The method of claim 2 wherein the pressure above the confined volume of liquid is reduced to a level at least sufficient to establish saturation of liquid and vapor.

4. The method of claim 3 wherein the liquid is water, the substance is carbon dioxide and the pH of the water is essentially neutral when the carbon dioxide is removed.

5. In a method of degasifying liquid, the steps comprising:
    (a) circulating liquid through an enclosed conduit,
    (b) intermittently diverting a controlled volume of liquid from the liquid circulated through said conduit,
    (c) inhibiting intermixing of the diverted liquid with liquid already degasified,
    (d) isolating said controlled volume from liquid in the enclosed conduit,
    (e) stilling the isolated volume of liquid to separate entrained gas,
    (f) reducing the pressure on the isolated volume of liquid by evacuating gas from above the volume and establishing a pressure above the isolated volume of liquid at least low enough to create saturation of liquid and vapor at the temperature of the controlled volume of liquid, (g) maintaining the pressure so reduced for a predetermined period of time to degasify the isolated liquid, then (h) discontinuing evacuation and (i) returning the isolated volume of liquid to the enclosed conduit.

6. The method of claim 5 in which the controlled volume of liquid is isolated in a chamber and wherein the controlled volume is returned to the supply by introducing additional liquid under fluid pressure to a chamber inlet to force the degasified liquid from an outlet of the chamber remote from the inlet.

7. Apparatus for degasifying controlled volumes of liquid, comprising in combination:

(a) a main enclosed liquid conveying conduit for carrying liquid, (b) a degasification chamber for containing a controlled volume of liquid, (c) baffle means associated with said chamber to inhibit mixing or circulation of incoming liquid with degasified liquid throughout the chamber, (d) first and second conduits connecting said chamber to the main enclosed liquid conveying conduit in parallel therewith, said first and second connecting conduits communicating with the chamber adjacent opposite ends to facilitate a through-flow of liquid, (e) automatically controllable valves in said first and second conduits operable to selectively permit flow of liquid between the main conduit and the chamber, (f) means to evacuate gas from the chamber and thereby reduce the pressure above liquid in the chamber, and (g) control means for automatically opening and closing the valves in the said first and second conduits for a predetermined time to introduce a predetermined volume of liquid to said chamber for degasification, and for operating the means to evacuate gas from the chamber for a predetermined time duration when said volume of liquid occupies said chamber, (h) whereby controlled volumes of liquid are intermittently introduced to the degasification chamber, degasified, and returned to the main conduit.

8. The apparatus of claim 7 including a valve to isolate the evacuating means from the chamber, said valve being automatically operated by the said control means.

References Cited

UNITED STATES PATENTS

| | | | |
|---|---|---|---|
| 2,195,898 | 4/1940 | Newton | 55—109 |
| 2,340,898 | 2/1944 | Race | 55—189 |
| 2,688,381 | 9/1954 | Epstein et al. | 55—19 |
| 3,002,583 | 10/1961 | Findlay | 55—19 |

FOREIGN PATENTS 452,265  11/1927  Germany.

REUBEN FRIEDMAN, Primary Examiner

CHARLES N. HART, Assistant Examiner

U.S. Cl. X.R.

55—55, 190